US010243226B2

(12) United States Patent
Berntsen et al.

(10) Patent No.: US 10,243,226 B2
(45) Date of Patent: Mar. 26, 2019

(54) FUEL CELL SYSTEM RIDE-THROUGH OF ELECTRIC GRID DISTURBANCES

(71) Applicant: FuelCell Energy, Inc., Danbury, CT (US)

(72) Inventors: George Berntsen, Shelton, CT (US); Nicholas Pasquale, Somers, NY (US)

(73) Assignee: FUELCELL ENERGY, INC., Danbury, CT (US)

(*) Notice: Subject to any disclaimer, the term of this patent is extended or adjusted under 35 U.S.C. 154(b) by 768 days.

(21) Appl. No.: 14/849,274

(22) Filed: Sep. 9, 2015

(65) Prior Publication Data
US 2017/0070088 A1 Mar. 9, 2017

(51) Int. Cl.
H01M 8/04 (2016.01)
H01M 8/04858 (2016.01)
H01M 8/04225 (2016.01)
H01M 8/04302 (2016.01)
H01M 8/0432 (2016.01)
H02J 1/00 (2006.01)
H02J 3/38 (2006.01)
H02J 9/06 (2006.01)

(52) U.S. Cl.
CPC ..... H01M 8/04925 (2013.01); H01M 8/0432 (2013.01); H01M 8/04225 (2016.02); H01M 8/04302 (2016.02); H02J 1/00 (2013.01); H02J 3/387 (2013.01); H02J 9/062 (2013.01); H01M 2250/10 (2013.01); H02J 2001/004 (2013.01); Y02B 90/14 (2013.01)

(58) Field of Classification Search
None
See application file for complete search history.

(56) References Cited

U.S. PATENT DOCUMENTS 7,061,139 B2 6/2006 Young et al.
8,253,273 B2 8/2012 Fredette et al.
2003/0077499 A1 4/2003 Siepierski et al.
(Continued)

FOREIGN PATENT DOCUMENTS

EP 2 047 590 A1 4/2009
WO WO-2012/068017 A2 5/2012

OTHER PUBLICATIONS

International Search Report and Written Opinion received in co-pending PCT/US2016/044283 dated Nov. 28, 2016 (10 pages).
(Continued)

Primary Examiner — Jonathan Crepeau
Assistant Examiner — Angela J Martin
(74) Attorney, Agent, or Firm — Foley & Lardner LLP

(57) ABSTRACT

A fuel cell system includes a fuel cell assembly configured to generate a direct current (DC) signal. The fuel cell system also includes one or more inverters coupled to the fuel cell assembly by way of one or more first bus lines. The fuel cell system also includes a variable frequency drive (VFD) coupled to an output of the one or more inverters and configured to receive AC power from the one or more inverters. The VFD is configured to convert the AC power to DC power and to provide the DC power to at least one auxiliary component during a normal operating condition. The fuel cell system further includes one or more second bus lines configured to receive the DC signal via the one or more first bus lines and to provide the DC signal to the VFD to power the at least one auxiliary component during a low voltage ride through condition.

20 Claims, 3 Drawing Sheets

(56) References Cited

U.S. PATENT DOCUMENTS

| | | |
|---|---|---|
| 2007/0151272 A1 | 7/2007 | Cosan et al. |
| 2008/0192510 A1 | 8/2008 | Falk |
| 2012/0326504 A1 | 12/2012 | Ballantine et al. |
| 2014/0009003 A1 | 1/2014 | Ballantine et al. |

OTHER PUBLICATIONS

Extended European Search Report in EP16844845.4 dated Jan. 7, 2019 (9 pages).

FUEL CELL SYSTEM RIDE-THROUGH OF ELECTRIC GRID DISTURBANCES

BACKGROUND

A fuel cell is a device which converts chemical energy, such as energy stored in a hydrocarbon fuel, into electrical energy by way of an electrochemical reaction. Generally, a fuel cell includes an anode electrode and a cathode electrode separated by an electrolyte that serves to conduct electrically charged ions. High temperature fuel cells, such as molten carbonate fuel cells and solid oxide fuel cells, operate by passing a reactant fuel gas through the anode electrode, while oxidant gas (e.g., carbon dioxide and oxygen) is passed through the cathode electrode. In order to produce a desired power level, a number of individual fuel cells can be stacked in series.

Fuel cell systems and power plants include a fuel cell stack and balance of plant components, which include supporting and/or auxiliary components specific to the fuel cell power plant. These balance of plant components integrate the fuel cell stack into a comprehensive power system and allow the system to comply with site-specific requirements. In fuel cell systems, the balance of plant components can include pumps, blowers, sensors, instrumentation, control devices, heaters, heat exchangers, oxidizers, deoxidizer and desulfurizer assemblies, etc. These balance of plant components in a fuel cell power plant have significant parasitic loads and require continuous electrical power to support fuel cell electric power production.

SUMMARY

An illustrative fuel cell system includes a fuel cell assembly configured to generate a direct current (DC) signal. The fuel cell system also includes one or more inverters coupled to the fuel cell assembly by way of one or more first bus lines. The fuel cell system also includes a variable frequency drive (VFD) coupled to an output of the one or more inverters and configured to receive AC power from the one or more inverters. The VFD is configured to convert the AC power to DC power and to provide the DC power to at least one auxiliary component during a normal operating condition. The fuel cell system further includes one or more second bus lines configured to receive the DC signal via the one or more first bus lines and to provide the DC signal to the VFD to power the at least one auxiliary component during a low voltage ride through condition.

An illustrative method for operating a fuel cell system during a low voltage ride through condition includes providing power to at least one auxiliary component by way of a variable frequency drive (VFD) during a normal operating condition. The VFD receives power from an output of one or more fuel cell inverters that are coupled to a fuel cell assembly by way of one or more bus lines. The method also includes determining that an output of the one or more fuel cell inverters is insufficient to power the at least one auxiliary component. The method further includes, responsive to the determination that the output of the one or more fuel cell inverters is insufficient, providing power by to the at least one auxiliary component by way of a direct connection between the VFD and the one or more bus lines that connect the fuel cell assembly to the one or more fuel cell inverters.

An illustrative method for performing startup of a fuel cell system includes providing power from an electric grid to at least one auxiliary component by way of a variable frequency drive (VFD) during startup of a fuel cell assembly. The method also includes determining that the fuel cell assembly has reached an operational temperature. The method also includes providing, based at least in part on the determination that the fuel cell assembly has reached the operational temperature, power to the at least one auxiliary component by way of a direct connection between the VFD and one or more bus lines that connect the fuel cell assembly to one or more fuel cell inverters. The method also includes determining that a first voltage output from the one or more fuel cell inverters is greater than a second voltage of the direct connection. The method further includes, responsive to the determination that the first voltage is greater than the second voltage, providing power from the output of the one or more fuel cell inverters to the at least one auxiliary component by way of the VFD.

The foregoing is a summary of the disclosure and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined by the claims, will become apparent in the detailed description set forth herein and taken in conjunction with the accompanying drawings.

DETAILED DESCRIPTION

Distributed generators, such as fuel cell power plants, are required to comply with electric grid interconnection codes. The interconnection codes define how distributed generators are to respond to severe and sustained decreases in electric grid voltage. Existing interconnection codes (e.g., IEEE-1547, UL-1741) require distributed generators to quickly disconnect from the grid during fault conditions and to remain disconnected until the electric system stabilizes. Due to the increased amount of distributed generation, it has been determined that it is desirable to have distributed generators remain connected during grid fault conditions in order to help stabilize the system. For example, California has proposed new electric grid interconnection code requirements that will require distributed generators to remain connected to the electric grid during a fault event, and to continue to supply current at low voltages for up to 30 seconds. These low voltages can be approximately 50-88% of the normal output voltage of the distributed generator. This process of providing low voltage during a fault event is referred to as a Low Voltage Ride Through (LVRT).

Inverters for handling LVRT situations have been developed for wind turbines and solar panels and may in the future be adapted to fuel cell inverters. However, fuel cell power plants have significant parasitic loads, such as blowers, pumps, heaters, and other balance of plant auxiliary components, that require continuous electrical power to support electric power production by the fuel cell system. The voltage output of fuel cell inverters is often too low during the LVRT conditions to support these parasitic loads. Therefore, power plant operation cannot be supported using fuel cell inverters, or LVRT capable inverters, since the parasitic load cannot be supported with the low voltage. In order to address this problem, conventional systems might employ large battery-supplied Uninterruptible Power Supply (UPS) devices or flywheel generators for supplying parasitic loads with power during LVRT transients. These solutions, however, increase the cost and space requirements, while decreasing plant electrical efficiency and introducing undesirable maintenance requirements.

Figure 1:
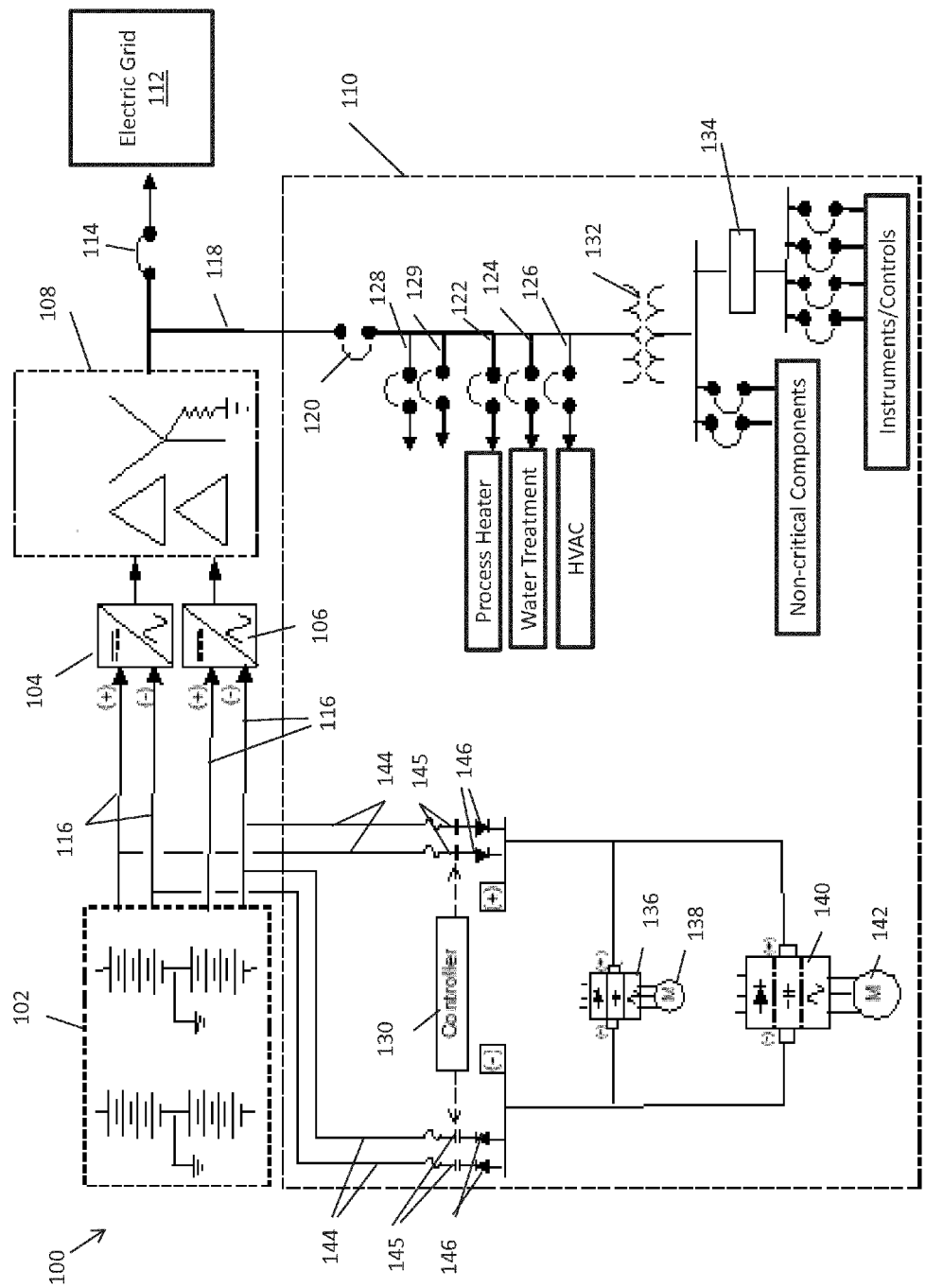
FIG. 1 is a diagram of a fuel cell system that is configured to provide power to a balance of plant assembly during a low voltage ride through condition in accordance with an illustrative embodiment.

The embodiments described herein allow at least the critical balance of plant auxiliary components to receive adequate power during grid disturbances, without sacrificing space or adding significant costs. FIG. 1 is a diagram of a fuel cell system 100 that is configured to provide power to a balance of plant assembly 110 during a low voltage ride through condition in accordance with an illustrative embodiment. The fuel cell system 100 includes a fuel cell assembly 102, fuel cell inverters 104 and 106, a fuel cell output transformer 108, a balance of plant system 110, and a plant controller 130. The fuel cell system 100 is connected to an electric grid 112 via a tie breaker 114 that acts as a switch to connect/disconnect the fuel cell system 100 to/from the electric grid 112. In alternative embodiments, the fuel cell system 100 may include fewer, additional, and/or different components.

The fuel cell assembly 102 is composed of two fuel cell columns, each of which includes two fuel cell stacks. In alternative embodiments, fewer or additional fuel cell columns may be used. Similarly, in other embodiments, each fuel cell column may include fewer or additional fuel cell stacks. In an illustrative embodiment, the fuel cells of fuel cell assembly 102 are molten carbonate fuel cells. In alternative embodiments, different types of fuel cells may be used. In another illustrative embodiment, the fuel cell assembly 102 generates a 1400 kilowatt (kW) net output when operating at full power, and has a parasitic load of approximately 50 kW for auxiliary components. However, these are merely example values and the embodiments described herein can apply to smaller or larger fuel cell assemblies and/or parasitic loads.

The columns of the fuel cell assembly 102 are connected to the fuel cell inverters 104 and 106 via bus lines 116. Upon receipt of DC current generated by the fuel cell assembly 102, the fuel cell inverters 104 and 106 invert the DC current into an AC current, which is fed to the fuel cell output transformer 108. The fuel cell output transformer 108 steps the AC current received from the fuel cell inverters 104 and 106 down into a desired value that is compatible with the electric grid 112. In alternative embodiments, the fuel cell output transformer 108 may boost the signal received from the fuel cell inverters 104 and 106. In an illustrative embodiment, during normal full power operation, the voltage along bus lines 116 is 610 Volts (V) DC, and an output from the fuel cell output transformer 108 is 480 V AC. In alternative implementations, the voltages at the bus lines 116 and/or at the output of the fuel cell output transformer 108 may differ.

A bus line 118 connects an output of the fuel cell output transformer 108 to the balance of plant system 110. The bus line 118 also connects the balance of plant system 110 to the electric grid 112 when the tie breaker 114 is in a closed position. The bus line 118 also includes a tie breaker 120 such that the balance of plant system 110 can be disconnected from the output of the fuel cell output transformer 108 and the electric grid 112. The bus line 118 is used to power auxiliary components of the balance of plant system 110. For example, a first branch 122 off of the bus line 118 is used to power a process heater, a second branch 124 off of the bus line 118 is used to power a water treatment unit, and a third branch 126 off of the bus line 118 is used to power an HVAC system. The process heater can be used to pre-heat the fuel and/or oxidant gas that is supplied to the fuel cell stacks. The water treatment unit can be used to vaporize water for humidifying fuel and/or for cleaning water recovered from the fuel cell assembly 102. The HVAC can be used to ventilate the fuel cell system 100 and provide thermal control.

A fourth branch 128 off of the bus line 118 is fed to a Variable Frequency Drive (VFD) 136 of a water pump 138, and a fifth branch 129 off of the bus line 118 is fed to a VFD 140 of a blower 142. The VFDs, which can be commercial off the shelf components or custom components depending on the implementation, are discussed in more detail below. Each of the first branch 122, the second branch 124, the third branch 126, the fourth branch 128, and the fifth branch 129 includes a tie breaker such that the branches can be selectively disconnected from the bus line 118. In alternative embodiments, fewer or additional branches off of the bus line 118 may be included, depending on the number of balance of plant auxiliary components that need to be powered.

A transformer 132 is also connected to the bus line 118. The transformer 132 is used to step down the voltage on the bus line 118 such that auxiliary components having lower voltage requirements can be powered. In an illustrative embodiment, the voltage along the bus line 118 is 480 V AC, and the transformer 132 transforms that voltage into 120 V AC. Alternatively, the transformer 132 can generate a different voltage such as 208 V, etc. The 120 V AC signal is provided to one or more non-critical auxiliary components of the balance of plant system 110. The non-critical auxiliary components can include any components that are not critical to operation of the fuel cell system 100. The output of the transformer 132 is also fed to an Uninterruptible Power Supply (UPS) 134, which in turn is connected to instrumentation and controls of the fuel cell system 100. The UPS 134 can be a 3 kilovolt-amp (kVA) 120 V AC supply in one embodiment. Alternatively, a smaller or larger UPS may be used depend on load requirements of the instrumentation and controls. As shown in FIG. 1, suitable tie breakers or bus couplers may be used for each of the non-critical components and for each of the instrumentation and control components.

In an illustrative embodiment, the output from the transformer 132 charges the UPS 134, which in turn provides power to the instrumentation and controls. As a result, the instrumentation and controls can still receive power for a period of time in the event that the voltage along the bus line 118 drops or disappears. The instrumentation and controls can include sensors to detect the operating conditions and temperatures of different components of the fuel cell system 100. The instrumentation and controls can also include computer hardware such as a processor, memory, user interface, etc. that can be used to store and/or process data received from the sensors. The instrumentation and controls can also include programming (which may be stored in a memory in the form of computer-readable instructions) to control the operations and functioning of the fuel cell assembly 102, the balance of plant auxiliary components, etc. The instrumentation and controls can also control opening and closing of the tie breaker 114 and any of the other tie breakers of FIG. 1. The instrumentation and controls can also include the plant controller 130, which is configured to monitor and control temperature, flow rate, mode, etc. of the system.

In an illustrative embodiment, the VFD 136 of the water pump 138 and the VFD 140 of the blower 142 can each include an internal rectifier that is used to convert the input from the fourth branch 128 and the fifth branch 129 off of the bus line 118 from an AC signal into a DC signal to power the water pump 138 and the blower 142, respectively. The water pump 138 can be used to supply water to the fuel cell system 100 to feed the fuel cell steam reforming reaction. The blower 142 can be used to supply air or oxidant gas to the fuel cell stacks and to help cool the fuel cell system 100. The VFD 140 of the blower 142 is used to vary the blower speed and to allow for different amounts of air flow based on power plant conditions. In one embodiment, a Commercial-Off-The-Shelf (COTS) VFD may be used to power the blower 142. However, in other embodiments, the VFD may be customized for the specific configuration of the blower 142 or the specific configuration of the fuel cell system 100. The VFD 136 of the water pump 138 can be used to vary the speed and/or pressure of the water pump 138, and can also be a COTS component. Commercial VFD technology rectifies a 480 V AC 60 Hertz (Hz) input power to a DC link that is operated at 700 V DC. This DC power is then inverted to output variable frequency, 480 V, 3 phase power to the motor. Commercially available VFD devices also have a provision to be supplied with DC power directly to the VFD DC link.

The water pump 138 and the blower 142 can be 480 V 3-phase loads, although loads of other sizes can also be handled by the embodiments described herein. In one embodiment, the water pump 138 can include a two horsepower motor, and the blower 142 can include a 150 horsepower motor. Alternatively, a different sized water pump and/or blower can be used. In many systems, the power required to operate the blower 142 accounts for approximately 80% of the total power required by balance of plant auxiliary components. Additionally, the blower 142 and water pump 138 are, in many systems, vital components without which the fuel cell system cannot operate, even during an approximately 30 second Low Voltage Ride Through (LVRT) condition. As such, it is important that the blower 142 and the water pump 138 be operational during an LVRT condition.

During normal operation, the water pump 138 and the blower 142 are powered off of the bus line 118. During initial startup of the fuel cell system 100, the power for the water pump 138 and the blower 142 can originate from the electric grid 112. During full power operation of the fuel cell system, the power for the water pump 138 and the blower 142 can come from the output of the fuel cell output transformer 108 (i.e., originate from the fuel cell assembly 102). However, during a LVRT condition in which the electric grid 112 suffers from a voltage sag and the fuel cell assembly 100 is required to stay operational at a low voltage, the output of the fuel cell assembly is not sufficient to power the bus line 118, which feeds all of the balance of plant auxiliary components.

To allow the water pump 138 and the blower 142 to remain operational during a LVRT condition, the fuel cell system 100 of FIG. 1 includes bus lines 144 which directly couple the output of the fuel cell assembly from the bus lines 116 to the bus which powers both the water pump 138 and the blower 142. Because the range of DC voltage from the fuel cell assembly 102 is compatible with the DC links of the VFD 136 and the VFD 140, the fuel cell assembly 102 can directly supply the blower 142 and the water pump 138 with power when normal AC voltage is not available to them. In an illustrative embodiment, the bus lines 144 form a nominal 650 V bus, although different values may be used in alternative embodiments. The fuel cell system 100 of FIG. 1 also includes auctioneering power diodes 146 coupled to the bus lines 144. As explained in more detail below, the auctioneering power diodes allow the system to automatically control the input source of the water pump 138 and the blower 142 based on the operational status of both the fuel cell system 100 and the electric grid 112. Specifically, the auctioneering power diodes select the highest DC voltage from either the bus lines 144 or the fourth branch 128 and the fifth branch 129 (of the bus line 118) to power the VFD 136 and the VFD 140. The auctioneering diodes also prevent DC current from an internal link of the VFDs in the event that the DC current is higher than that of the DC bus lines 144. In an illustrative embodiment, fuses are included in or adjacent to the auctioneering power diodes for short circuit protection. In another illustrative embodiment, the bus lines 144 also include DC contactors 145, which provide a way to isolate the fuel cell assembly 102 from the loads (i.e., the VFD 136 and the VFD 140) when the fuel cell assembly 102 is not able to supply current, such as during a plant shutdown or during plant heat up. In an illustrative embodiment, the DC contactors 145 are controlled by the plant controller 130. As such, the bus lines 144 provide an alternative power source to the VFD 136 and the VFD 140 during times when there is insufficient AC power along the bus line 118. In alternative embodiments, the bus lines 144 can be used to power fewer, additional, and/or different auxiliary balance of plant components.

Figure 2:
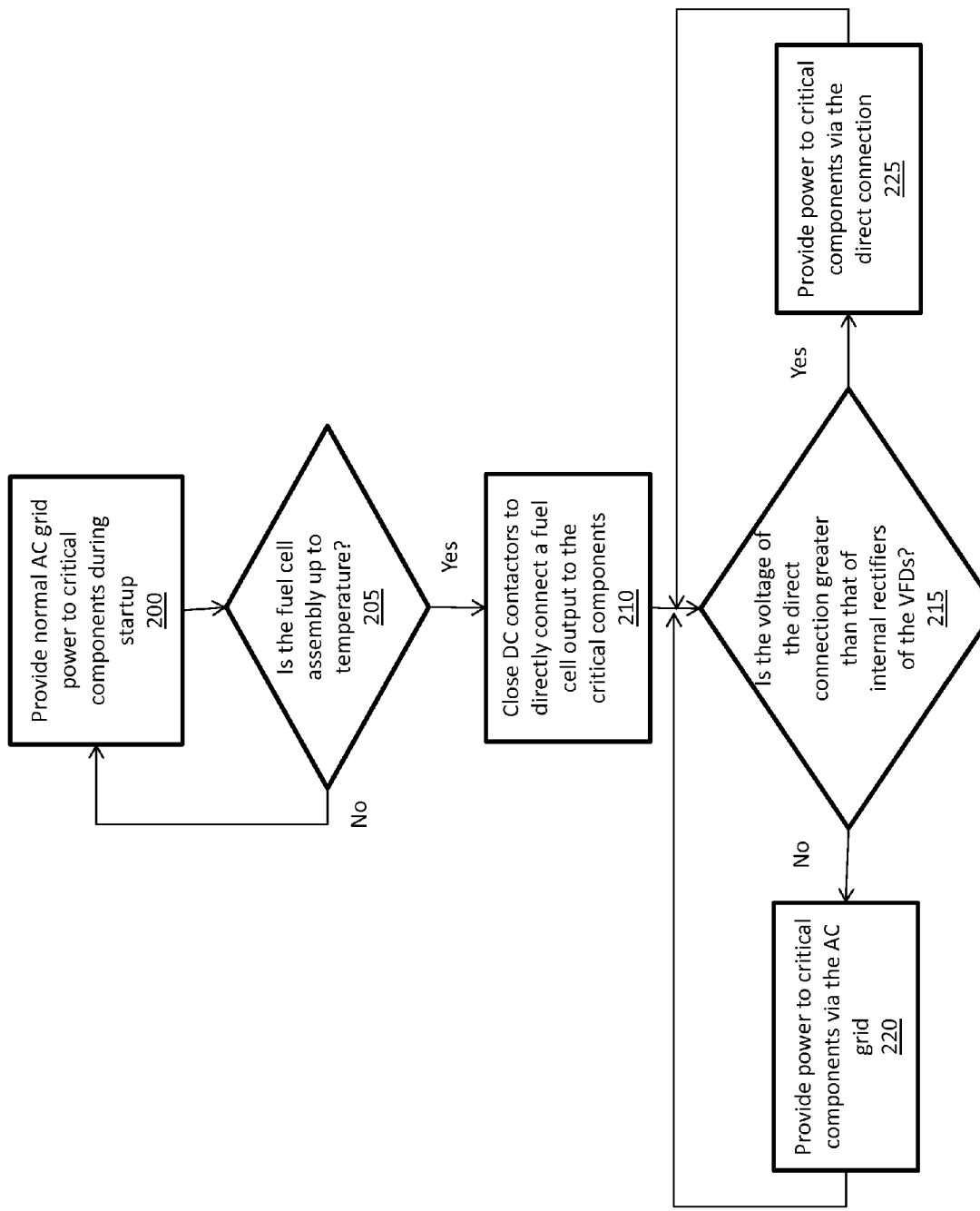
FIG. 2 is a flow diagram depicting startup operations for a fuel cell system in accordance with an illustrative embodiment.

FIG. 2 is a flow diagram depicting startup operations for a fuel cell system in accordance with an illustrative embodiment. In alternative embodiments, fewer, additional, and/or different operations may be performed. Also, the use of a flow diagram is not intended to be limiting with respect to the order of operations performed. In an operation 200, during startup of a fuel cell system, normal AC grid power is provided to critical auxiliary balance of plant components. The VFDs convert this AC input power to approximately 650 V DC, although other values may be used in alternative embodiments. The fuel cell system can be the fuel cell system 100 discussed with reference to FIG. 1. The critical components can be the water pump 138, the blower 142, and/or any other components deemed important or necessary for startup of the fuel cell assembly 102. During startup when the fuel cell assembly 102 is not up to temperature and unable to generate power, the tiebreaker 114 can be in a closed position such that the bus line 118 is in communication with the electric grid 112. As such, the power provided to the critical auxiliary components can originate from the electric grid 112 during startup. In alternative embodiments, another power source such as a battery, a UPS, generator set, etc. may be used instead of the electric grid 112 to feed the bus line 118 during startup.

In an operation 205, a determination is made regarding whether the fuel cell assembly is up to operating temperature. The operating temperature can be a predetermined value or range of values that are specific to the type of fuel cells being used and the specifications of the fuel cell plant. As just one example, the determination can be made using the plant controller 130 of FIG. 1, which can include or be in communication with a temperature sensor. If it is determined in the operation 205 that the fuel cell assembly is not up to temperature, the system continues to provide power to the critical components via the electric grid in the operation 200. If it is determined in the operation 205 that the fuel cell assembly is up to temperature, DC contactors which enable a direct connection between the output of the fuel cell assembly and the critical components are closed in an operation 210. The DC contactors can be closed by the plant controller 130. In alternative embodiments, any other type of switching mechanism may be used in place of the DC contactors. In an illustrative embodiment, the direct connection is represented by the bus lines 144 of FIG. 1, which connect the output of the fuel cell assembly 102 to the inputs of the VFD 136 for the water pump 138 and the VFD 140 for the blower 142.

In an operation 215, a determination is made regarding whether the voltage available from the direction connection is greater than the voltage of the internal rectifiers of the VFDs. In an illustrative embodiment, when the fuel cell assembly initially reaches the desired operating temperature during startup, the fuel cell assembly will not yet be providing power to the electric grid, and will therefore be in an unloaded condition. As a result of being in an unloaded condition upon reaching the desired startup temperature, the voltage being output from the fuel cell assembly (i.e., the voltage along the bus lines 116 and therefore the voltage along the bus lines 144 of FIG. 1) will be approximately 800 V DC, which is higher than the voltage along those bus lines when the fuel cell assembly is in a loaded condition. As such, the approximately 800 V DC signal along the direct connection (i.e., along the bus lines 144) will be greater than the output of the internal rectifiers of the VFDs, which will be approximately 650 V DC at a nominal 480V AC input AC power. In such a situation, the determination of operation 215 is affirmative, and power is provided to the critical components via the direction connection in an operation 225.

Once the fuel cell assembly is up to temperature and the fuel cell inverters begin to draw DC current to produce power, the fuel cell stack-pair voltages will decrease in proportion to load such that at normal full power operation the voltage along the bus lines 116 and the bus lines 144 will be approximately 610 V DC. As such, the approximately 610 V DC signal along the direct connection will be less than the approximate 650 V DC output of the internal rectifiers of the VFDs. In such a situation, the determination of operation 215 is negative, and power is provided to the critical components via the input power to the VFDs from the AC grid (or alternatively from the output of the fuel cell inverters) in an operation 220.

In an illustrative embodiment, the determination of operation 215 can be made automatically by auctioneering power diodes such as the auctioneering power diodes 146 of FIG. 1. In an alternative embodiment, the determination may be made by the plant controller 130, or by another computing system that monitors the voltages and/or by any other voltage comparison methods known to those of skill in the art.

Figure 3:
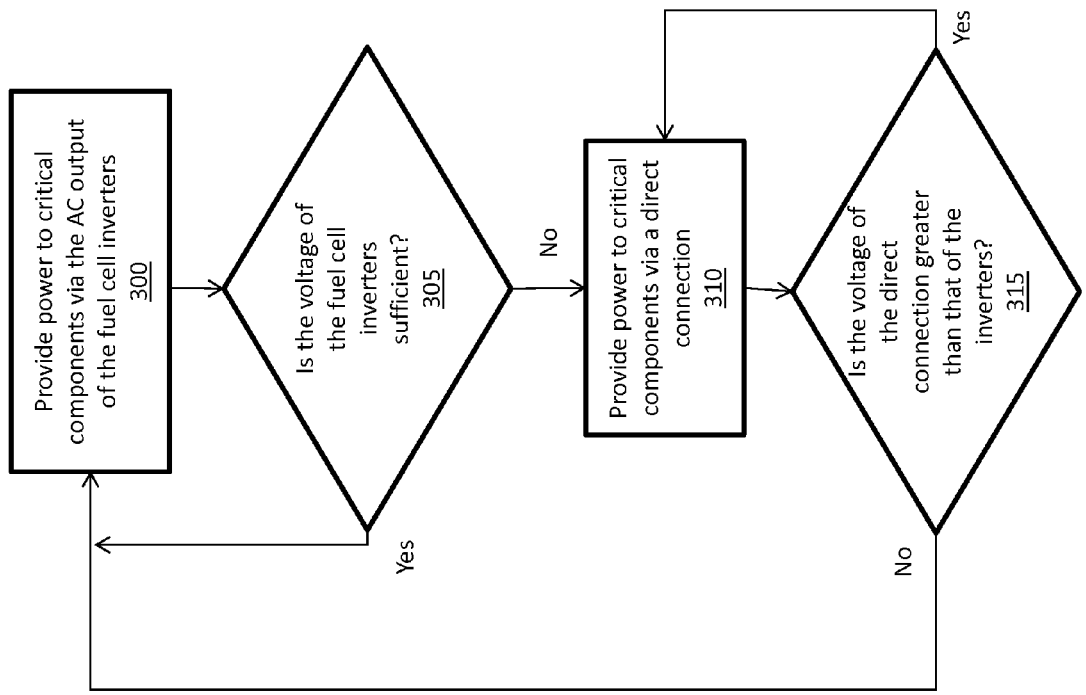
FIG. 3 is a flow diagram depicting power distribution operations for a fuel cell system experiencing a low voltage ride through condition in accordance with an illustrative embodiment.

FIG. 3 is a flow diagram depicting power distribution operations for a fuel cell system experiencing a low voltage ride through condition in accordance with an illustrative embodiment. In alternative embodiments, fewer, additional, and/or different operations may be performed. Also, the use of a flow diagram is not intended to be limiting with respect to the order of operations performed. In an operation 300, power is provided to critical auxiliary balance of plant components via the AC output of the fuel cell inverters during normal, full power operation of the fuel cell system. In an illustrative embodiment, the fuel cell system can be the fuel cell system 100, and the critical components can be the water pump 138 and the blower 142 of FIG. 1. In alternative embodiments, different components may be considered critical to the system.

In an operation 305, a determination is made regarding whether the DC voltage derived by the internal rectifiers of the VFDs from AC input power is sufficient to power the critical components of the system. If the fuel cell system is experiencing an LVRT condition, the output of the fuel cell inverters (e.g., the fuel cell inverters 104 and 106 of FIG. 1) will drop at least in part due to the imposed low voltage operation requirement. In such a LVRT situation, the output of the fuel cell inverters will be too low to provide adequate AC power to the VFDs. In one embodiment, the determination can be made by the auctioneering power diodes described with reference to FIG. 1, and a determination that the voltage of the internal rectifiers of the VFDs is not sufficient can be based on the auctioneering power diodes determining that the voltage along the bus lines 144 is greater than the voltage of the fourth branch 128 and the fifth branch 129 of the bus line 118. In an alternative embodiment, the determination can be made by the plant controller 130, a computing system, or any other voltage monitoring equipment known to those of skill in the art. If it is determined in the operation 305 that the voltage of the internal rectifiers of the VFDs is sufficient, the system can continue to provide power to the critical components in the operation 300. If it is determined in the operation 305 that the voltage of the internal rectifiers of the VFDs is not sufficient, the system provides power to the critical components via a direct connection in an operation 310. The direct connection can be the bus lines 144 illustrated with reference to FIG. 1.

In an operation 315, a determination is made regarding whether the DC voltage of the direct connection is greater than the voltage of the internal rectifiers of the VFDs derived from the AC input power. As discussed above, during an LVRT condition, the AC input voltage available to the VFDs will drop low and will be insufficient to power the critical components. However, as the electric grid recovers and the LVRT operating state ends, the output of the fuel cell assembly will again increase such that the DC voltage derived by the VFDs from the AC input power again exceeds that of the direct connection. As such, if the voltage of the internal rectifiers of the VFDs increases to a value greater than that of the direct connection and the operation 315 is negative, power to the critical components will again be provided by the AC output of the fuel cell inverters to the VFDs in the operation 300. Such a scenario is indicative of termination of the LVRT condition. If the voltage of the DC rectifier remains low and the determination of the operation 315 is positive, the system will continue to provide power to the critical components via the direct connection in the operation 310. Although not shown in FIG. 3, during the LVRT condition, the instrumentation and controls are supplied with stored power from the UPS 134 as discussed with respect to FIG. 1. As such, the computing components, controls, sensors, etc. necessary or important to operation of the fuel cell system are able to remain operational during the LVRT condition.

The embodiments described herein allow critical auxiliary components of the balance of plant system to be supplied with power during low voltage conditions on the electric grid, so that the fuel cell power plant can continue to operate until the grid voltage recovers to normal. This also allows the fuel cell system to continue supplying output current to the electric grid so as to aid in the recovery and stabilization of the electric grid. Even with the non-critical parasitic loads being inoperable due to the loss of power during the low voltage conditions, the fuel cell power plant can still operate for a sufficient period of time for the grid to recover, and for the sufficient period of time prescribed by the new interconnection codes. In an alternative embodiment, the fuel cell system 100 of FIG. 1 can be modified to include a relatively small, COTS inverter to be supplied with power from the bus lines 144 to provide power for operation of the remaining parasitic load of the power plant. This remaining non-critical parasitic load constitutes about 20% of the total parasitic load of the fuel cell system. In this modified arrangement, the fuel cell system would be able to operate indefinitely without power from the electric grid or the fuel cell inverters.

In all cases it is understood that the above-described arrangements are merely illustrative of the many possible specific embodiments which represent applications of the described subject matter. Numerous and varied other arrangements can be readily devised in accordance with the principles of the present subject matter without departing from the spirit and scope of the invention. It is also noted that any of the operations described herein can be implemented as computer-readable instructions stored on a non-transitory computer-readable medium such as a computer memory.

It is also to be understood that the construction and arrangement of the elements of the systems and methods as shown in the representative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed.

Furthermore, functions and procedures described above may be performed by specialized equipment designed to perform the particular functions and procedures. The functions may also be performed by general-use equipment that executes commands related to the functions and procedures, or each function and procedure may be performed by a different piece of equipment with one piece of equipment serving as control or with a separate control device.

What is claimed is:

1. A fuel cell system comprising:
a fuel cell assembly configured to generate a direct current (DC) signal;
one or more inverters coupled to the fuel cell assembly by way of one or more first bus lines;
a variable frequency drive (VFD) coupled to an output of the one or more inverters and configured to receive AC power from the one or more inverters, wherein the VFD is configured to convert the AC power to DC power and to provide the DC power to at least one auxiliary component during a normal operating condition; and
one or more second bus lines configured to receive the DC signal via the one or more first bus lines and to provide the DC signal to the VFD to power the at least one auxiliary component during a low voltage ride through condition.

2. The fuel cell system of claim 1, further comprising a fuel cell output transformer coupled to the one or more inverters, wherein the VFD is coupled to an output of the fuel cell output transformer.

3. The fuel cell system of claim 1, further comprising one or more auctioneering power diodes coupled to the one or more second bus lines between the one or more first bus lines and the at least one auxiliary component.

4. The fuel cell system of claim 1, wherein the VFD includes an internal rectifier, and wherein the internal rectifier is configured to convert the AC power from the one or more inverters into the DC power.

5. The fuel cell system of claim 1, further comprising one or more contactors on the one or more second bus lines between the one or more first bus lines and the VFD.

6. The fuel cell system of claim 5, further comprising a plant controller that is configured to control the one or more contactors to open and close a connection between the one or more second bus lines and the VFD.

7. The fuel cell system of claim 1, further comprising an uninterruptible power supply that is configured to provide power to at least one control component during the low voltage ride through condition.

8. The fuel cell system of claim 7, wherein the uninterruptible power supply is configured to receive a charge from the output of the one or more inverters during the normal operating condition.

9. The fuel cell system of claim 1, wherein the at least one auxiliary component comprises one or more of a water pump and a blower.

10. A method for operating a fuel cell system during a low voltage ride through condition, the method comprising:
providing power to at least one auxiliary component by way of a variable frequency drive (VFD) during a normal operating condition, wherein the VFD receives power from an output of one or more fuel cell inverters that are coupled to a fuel cell assembly by way of one or more bus lines;
determining that an output of the one or more fuel cell inverters is insufficient to power the at least one auxiliary component; and
responsive to the determination that the output of the one or more fuel cell inverters is insufficient, providing power to the at least one auxiliary component by way of a direct connection between the VFD and the one or more bus lines that connect the fuel cell assembly to the one or more fuel cell inverters.

11. The method of claim 10, further comprising providing power to one or more control components by way of an uninterruptible power supply during the low voltage ride through condition.

12. The method of claim 11, further comprising charging the uninterruptible power supply with the output of the one or more fuel cell inverters during the normal operating condition.

13. The method of claim 10, wherein the determining is performed by one or more auctioneering power diodes coupled to the direct connection.

14. The method of claim 13, wherein the VFD includes an internal rectifier that receives the power from the output of one or more fuel cell inverters.

15. The method of claim 10, further comprising closing one or more contactors on the direction connection responsive to the determination that the output of the one or more fuel cell inverters is insufficient.

16. A method for performing startup of a fuel cell system, the method comprising:
providing power from an electric grid to at least one auxiliary component by way of a variable frequency drive (VFD) during startup of a fuel cell assembly;

determining that the fuel cell assembly has reached an operational temperature;

providing, based at least in part on the determination that the fuel cell assembly has reached the operational temperature, power to the at least one auxiliary component by way of a direct connection between the VFD and one or more bus lines that connect the fuel cell assembly to one or more fuel cell inverters;

determining that a first voltage output from the one or more fuel cell inverters is greater than a second voltage of the direct connection; and responsive to the determination that the first voltage is greater than the second voltage, providing power from the output of the one or more fuel cell inverters to the at least one auxiliary component by way of the VFD.

17. The method of claim 16, further comprising, responsive to the determination that the fuel cell assembly has reached the operational temperature, closing one more contactors to form the direct connection.

18. The method of claim 16, wherein the first voltage is less than the second voltage when the fuel cell assembly is in an unloaded state, and wherein the fuel cell assembly is not providing power to the electric grid in the unloaded state.

19. The method of claim 16, wherein the first voltage is greater than the second voltage when the fuel cell assembly is in a loaded state, and wherein the fuel cell assembly is providing power to the electric grid in the loaded state.

20. The method of claim 16, further comprising rectifying, by an internal rectifier of the VFD, the power from the electric grid such that DC power is provided by the VFD to the at least one auxiliary component.

* * * * *